United States Patent
Lo et al.

(10) Patent No.: US 9,013,387 B2
(45) Date of Patent: Apr. 21, 2015

(54) CHARGE-SHARING TYPE PIXEL STRUCTURE

(75) Inventors: Shih-hsun Lo, Shenzhen (CN); Minghung Shih, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 13/511,669

(22) PCT Filed: Mar. 27, 2012

(86) PCT No.: PCT/CN2012/073082
§ 371 (c)(1),
(2), (4) Date: May 24, 2012

(87) PCT Pub. No.: WO2013/139046
PCT Pub. Date: Sep. 26, 2013

(65) Prior Publication Data
US 2015/0015821 A1    Jan. 15, 2015

(30) Foreign Application Priority Data
Mar. 20, 2012 (CN) .......................... 2012 1 0074454

(51) Int. Cl.
G09G 3/36       (2006.01)
G02F 1/1343    (2006.01)
G02F 1/1368    (2006.01)
G02F 1/1362    (2006.01)

(52) U.S. Cl.
CPC ........ G02F 1/134309 (2013.01); G02F 1/1368 (2013.01); G02F 1/13624 (2013.01); G09G 3/3659 (2013.01); G09G 2300/0852 (2013.01); G02F 2001/134345 (2013.01); G02F 2001/13685 (2013.01)

(58) Field of Classification Search
CPC ........... G09G 3/36–3/3696; G09G 2300/0439; G09G 2300/0443
USPC .................................. 345/87–104, 204, 690
See application file for complete search history.

(56) References Cited

U.S. PATENT DOCUMENTS

| | | | |
|---|---|---|---|
| 2006/0066512 A1* | 3/2006 | Afentakis et al. ............... | 345/55 |
| 2008/0116501 A1* | 5/2008 | Lin et al. ........................ | 257/315 |
| 2011/0148937 A1* | 6/2011 | Park et al. ..................... | 345/690 |
| 2011/0150169 A1* | 6/2011 | Lin et al. ......................... | 377/64 |
| 2011/0170031 A1* | 7/2011 | Son et al. ........................ | 349/46 |
| 2011/0267567 A1* | 11/2011 | Ting et al. ..................... | 349/123 |

* cited by examiner

Primary Examiner — Stephen Sherman
(74) Attorney, Agent, or Firm — Mark M. Friedman

(57) ABSTRACT

The present invention discloses a charge-sharing type pixel structure having a first sub-pixel and a second sub-pixel that each includes a transistor. The second sub-pixel further has a third transistor and a top-gate electrode. When the third transistor is switched on, original gray scale applied to a liquid crystal capacitor of the first sub-pixel varies due to charges being shared with other capacitors. The top-gate electrode change the threshold voltage of the third transistor according to biasing signal so as to further adjust the variation of the gray scale voltage applied to the liquid crystal capacitor of the first sub-pixel.

11 Claims, 4 Drawing Sheets

CHARGE-SHARING TYPE PIXEL STRUCTURE

BACKGROUND OF THE INVENTION

1. Field of the Invention

The present invention relates to a pixel structure, especially to a charge-sharing type pixel structure.

2. Description of the Related Art

Thin-film transistor LCD is one type of liquid crystal display device. Because of having advantages of high resolution, low power consumption, light weight and variety of sizes, thin-film transistor LCD has been widely used in the field of liquid crystal display device.

Large sized thin-film transistor LCD has a view angle problem, that is, when a user watch the screen of the LCD with different angles, the screen has different brightness and contrast. Nowadays, in order to improve the shortcoming of poor view angle of thin-film transistor LCD, manufacturers has disclosed various wide viewing angle technologies, such as multi-domain vertical alignment (MVA) technology, which effectively increase the viewing angle of the display device. However, although the MVA technology can improve viewing angle problem, a color-washout problem occurred at oblique viewing angles remains to be solved.

In order to harmonize the colors at oblique viewing angles and a vertical viewing angle, manufacturers has provided a charge-share pixel structure. As shown in FIG. 1, a charge-share pixel structure 9 is to divide a pixel into a first sub-pixel 90 and a second sub-pixel 91, wherein the first sub-pixel 90 has a first thin-film transistor TFT1 that is connected to a first gate line Gn, a second thin-film transistor TFT2 that is connected to the first gate line Gn, and a voltage-dividing thin-film transistor TFTS that is connected to the second thin-film transistor TFT2 and a second gate line Gn+1. When the first thin-film transistor TFT1 and the second thin-film transistor TFT2 are simultaneously switched on by the first gate line Gn, a liquid crystal capacitor Clc1 of the first sub-pixel 90 and a liquid crystal capacitor Clc2 of the second sub-pixel 91 have the same gray scale voltage. Subsequently, the voltage-dividing thin-film transistor TFTS is switched on by the second gate line Gn+1. Because charges are shared between the liquid crystal capacitor Clc1 of the first sub-pixel 90 and other voltage-dividing capacitors Ca, Cb, the liquid crystal capacitor Clc1 of the first sub-pixel 90 then has a gray scale voltage that is different from the gray scale voltage of the liquid crystal capacitor Clc2 of the second sub-pixel 91, and thereby improves color-washout phenomenon at oblique viewing angles.

However, for such design of the aforementioned charge-sharing pixel structure, once the mask pattern for forming the voltage-dividing capacitors and the voltage-dividing thin-film transistor is determined, division of gray scale voltage can not be re-adjusted except modifying the mask pattern, which lacks of flexibility.

Therefore, it is necessary to provide a charge-sharing type pixel structure to overcome the problems existing in the conventional technology.

SUMMARY OF THE INVENTION

In view of the shortcomings of the conventional technology, the main objective of the invention is to provide a charge-sharing type pixel structure where a top-gate electrode is positioned above the voltage-dividing transistor; and by adjusting the bias voltage of the top-gate electrode, the bias voltage of the sub-pixel accordingly can be adjusted. Therefore, the division of gray scale voltage can be adjusted without changing the design of the mask, the cost of manufacturing can be reduced, and it also makes the adjustment on color washout problem at oblique viewing angle to be more flexible.

In order to achieve the foregoing object of the present invention, the present invention provides a charge-sharing type pixel structure comprising:

a first gate line providing a first scanning signal;
a second gate line providing a second scanning signal;
a data line providing a data signal;
a first sub-pixel having:
  a first transistor being connected to the first gate line and the data line and being switched on when receiving the first scanning signal from the first gate line;
  a first liquid crystal capacitor being connected to the first transistor and receiving the data signal from the data line to be biased at a first gray scale voltage when the first transistor is switched on; and
  a first pixel electrode being connected to a drain of the first transistor;
a second sub-pixel having:
  a second transistor being connected to the first gate line and the data line and being switched on when receiving the first scanning signal from the first gate line;
  a second liquid crystal capacitor being connected to the second transistor and receiving the data signal from the data line to be biased at a second gray scale voltage when the second transistor is switched on;
  a third transistor being connected to a first voltage-dividing capacitor, a second voltage-dividing capacitor and the second gate line and being switched on when receiving the second scanning signal from the second gate line; when the third transistor is switched on, the first gray scale voltage applied to the first liquid crystal capacitor of the first sub-pixel varies due to charges being shared with the first voltage-dividing capacitor and the second voltage-dividing capacitor;
  a top-gate electrode changing a threshold voltage of the third transistor according to a biasing signal to further adjust the variation of the first gray scale voltage of the first liquid crystal capacitor; and
  a second pixel electrode being connected to a drain of the second transistor; and
a common line constructing a first storage capacitor with the first pixel electrode and constructing a second storage capacitor with the second pixel electrode.

In one embodiment of the present invention, the top-gate electrode is a transparent electrically conductive layer and is partially and insulatedly overlapped with the third transistor.

The present invention further provides another charge-sharing type pixel structure comprising:

a first gate line providing a first scanning signal;
a second gate line providing a second scanning signal;
a data line providing a data signal;
a first sub-pixel having:
  a first transistor being connected to the first gate line and the data line and being switched on when receiving the first scanning signal from the first gate line; and
  a first liquid crystal capacitor being connected to the first transistor and receiving the data signal from the data line to be biased at a first gray scale voltage when the first transistor is switched on; and
a second sub-pixel having:
  a second transistor being connected to the first gate line and the data line and being switched on when receiving the first scanning signal from the first gate line;

a second liquid crystal capacitor being connected to the second transistor and receiving the data signal from the data line to be biased at a second gray scale voltage when the second transistor is switched on;

a third transistor being connected to a first voltage-dividing capacitor and the second gate line and being switched on when receiving the second scanning signal from the second gate line;

when the third transistor is switched on, the first gray scale voltage applied to the first liquid crystal capacitor of the first sub-pixel varies due to charges being shared with the first voltage-dividing capacitor; and a top-gate electrode being positioned on an area partially overlapped with the third transistor, changing a threshold voltage of the third transistor according to a biasing signal to further adjust the variation of the first gray scale voltage of the first liquid crystal capacitor.

In one embodiment of the present invention, the second sub-pixel further has a second voltage-dividing capacitor being connected to the third transistor, and the second voltage-dividing capacitor shares charges with the first voltage-dividing capacitor and the first liquid crystal capacitor.

In one embodiment of the present invention, the pixel structure further comprises a first pixel electrode, a second pixel electrode and a common line; the first pixel electrode is connected to a drain of the first transistor; the second pixel electrode is connected to a drain of the second transistor; and the common line constructs a first storage capacitor with the first pixel electrode and constructs a second storage capacitor with the second pixel electrode.

In one embodiment of the present invention, the top-gate electrode is a transparent electrically conductive layer and is partially and insulatedly overlapped with the third transistor.

In one embodiment of the present invention, the top-gate, the first pixel electrode and the second pixel electrode are formed by the same transparent electrically conductive layer through a photolithography process.

In one embodiment of the present invention, the top-gate electrode is connected to a metallic signal line via an electrically conductive through hole.

In one embodiment of the present invention, the metallic signal line is the common line.

In one embodiment of the present invention, the metallic signal line is connected to a DC signal source.

In one embodiment of the present invention, the top-gate electrode is a non-transparent electrically conductive layer and connected to a DC signal source.

The present invention is to position a top-gate electrode upon the structure of a voltage-dividing transistor and adjust the bias voltage of the top-gate electrode to adjust the threshold voltage characteristic of the voltage-dividing transistor, and so as to further adjust the gray scale voltage applied to the sub-pixel. Therefore, division of gray scale voltage can be adjusted without changing the design of mask.

Other objectives, advantages and novel features of the invention will become more apparent from the following detailed description when taken in conjunction with the accompanying drawings.

DETAILED DESCRIPTION OF THE PREFERRED EMBODIMENTS

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto.

Figure 1:
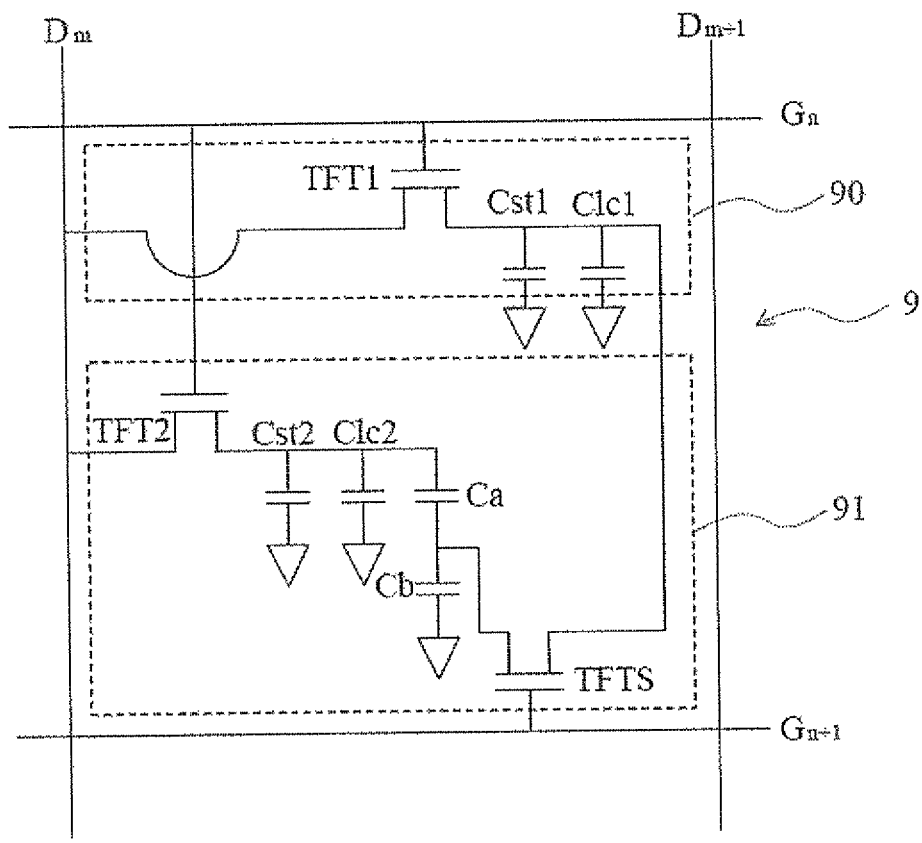
FIG. 1 is a circuit diagram of a conventional charge-sharing type pixel structure.
Figure 2:
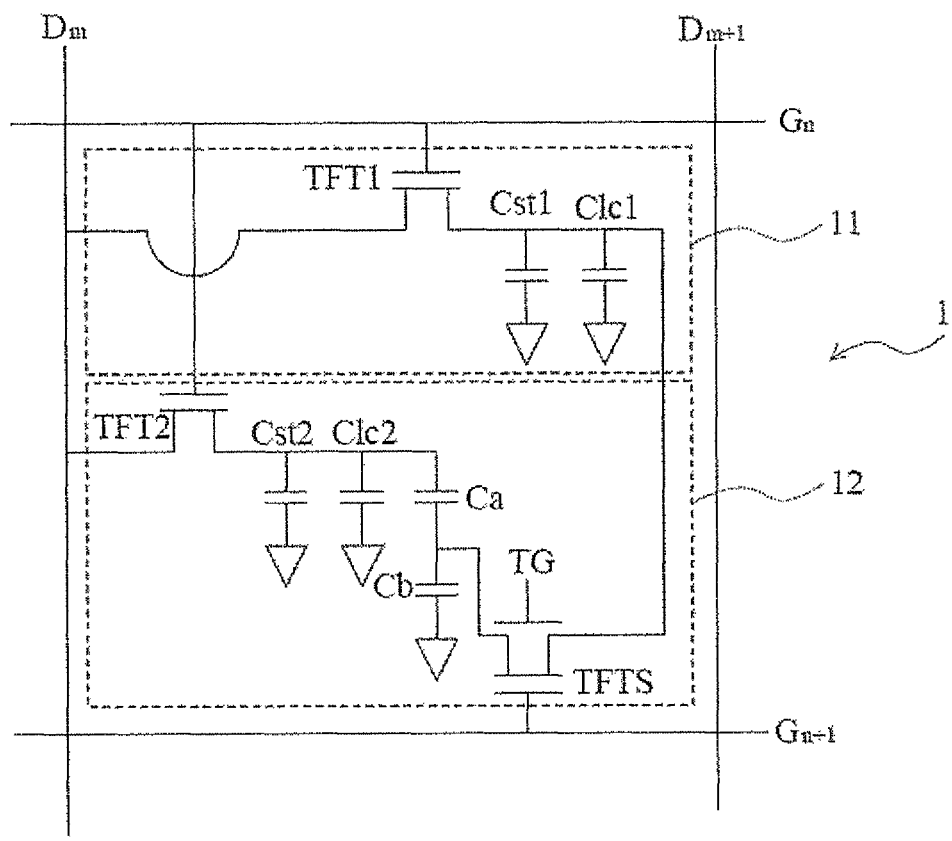
FIG. 2 is a circuit diagram of a preferred embodiment of a charge-sharing type pixel structure in accordance with the present invention.

With reference FIG. 2, FIG. 2 is a circuit diagram of a preferred embodiment of a charge-sharing type pixel structure in accordance with the present invention. A charge-sharing type pixel structure 1 comprises a first sub-pixel 11 and a second sub-pixel 12.

With reference to FIG. 2, the first sub-pixel 11 is connected to a first gate line Gn and a date line Dm, wherein the first gate line Gn is connected to a gate-line driving circuit such that the first gate line Gn can provide a first scanning signal, and the data line Dm is connected to a data-line driving circuit such that the data line Dm can provide a data signal. In more details, the first sub-pixel 11 has a first transistor TFT1 and a first liquid crystal capacitor Clc1. The first transistor TFT1 is a thin-film transistor and has a gate connected to the first gate line Gn and a source connected to the data line Dm. Whne the gate-line driving circuit drives the first gate line Gn to transmit the first scanning signal to the gate of the first transistor TFT1, the first transistor TFT1 then is switched on. The first liquid crystal capacitor Clc1 is connected to the first transistor TFT1 and is constructed by a first pixel electrode and a common electrode (not shown in the figure), wherein the first pixel electrode is connected to a drain of the first transistor TFT1. The first liquid crystal capacitor Clc1 receives the data signal from the data line Dm through the first transistor TFT1 to be biased at a first gray scale voltage when the first transistor TFT1 is switched on.

With reference to FIG. 2, the second sub-pixel 12 is also connected to the first gate line Gn and the data line Dm and further connected to a second gate line Gn+1. The second gate line Gn+1 follows the first gate line Gn to be driven by the gate-line driving circuit so as to provide a second scanning signal. In more details, the second sub-pixel 12 has a second transistor TFT2, a third transistor TFTS, a second liquid crystal capacitor Clc2 and a top-gate electrode TG. The second transistor TFT2 is a thin-film transistor and has a gate connected to the first gate line Gn and a source connected to the data line Dm. Similarly, when the gate-line driving circuit drives the first gate line Gn to transmit the first scanning signal to the gate of the second transistor TFT2, the second transistor TFT2 is then switched on, that is, when the gate-line driving circuit drives the first gate line Gn to transmit the first scanning signal, the first transistor TFT1 and the second transistor TFT2 are simultaneously switched on. A first end of the third transistor TFTS is connected to the second gate line Gn+1, a second end thereof is connected to a first voltage-dividing capacitor Ca, and a third end thereof is connected to the first liquid crystal capacitor Clc1 of the first transistor TFT1.

When the gate-line driving circuit drives the second gate line Gn+1 to provide the second scanning signal to the first end of the third transistor TFTS, the third transistor TFTS then is switched on. Moreover, when the third transistor TFTS is switched on, the first gray scale voltage applied to the first liquid crystal capacitor Clc1 varies by sharing charges with the first voltage-dividing capacitor Ca.

With reference to FIG. 2, the second liquid crystal capacitor Clc2 is connected to the second transistor TFT2 and is constructed by a second pixel electrode and a common electrode (not shown in the figure), wherein the second pixel electrode is connected to a drain of the second transistor TFT2. When the second transistor TFT2 is switched on, the second liquid crystal capacitor Clc2 receives the data signal from the data line Dm through the second transistor TFT2 to be biased at a second gray scale voltage; when the third transistor TFTS is not yet switched on, the second gray scale voltage is equal to the first gray scale voltage; and when the third transistor TFTS is switched on, through charge sharing, the first gray scale voltage will vary and not be equal to the second gray scale voltage. Moreover, the second liquid crystal capacitor Clc2 is further connected to the third transistor TFTS via the first voltage-dividing capacitor Ca.

Figure 4:
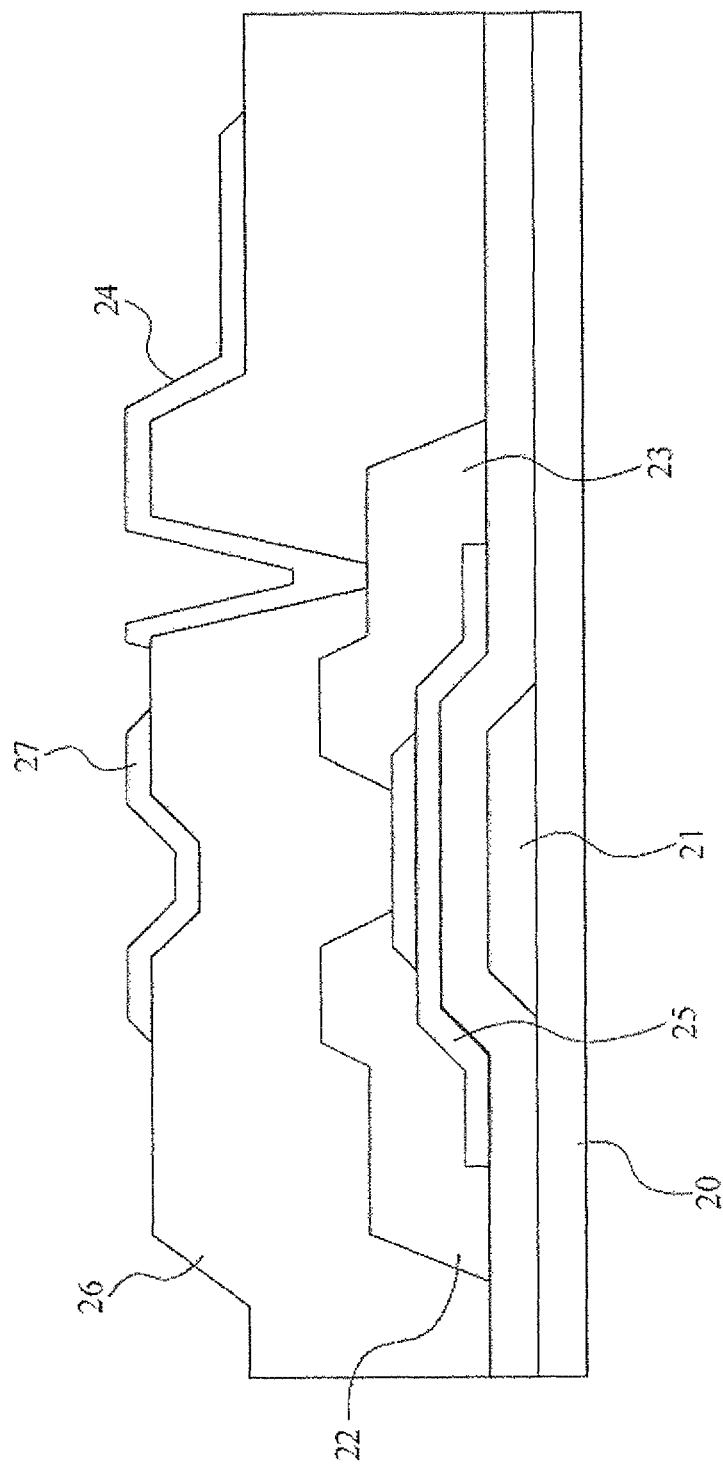
FIG. 4 is a cross-sectional view of a preferred embodiment of a third transistor of a second sub-pixel of the charge-sharing type pixel structure.

For further describing the top-gate electrode TG, please refer to FIG. 4, FIG. 4 is a cross-sectional view of a preferred embodiment of the third transistor TFTS of the second sub-pixel 12 of the charge-sharing type pixel structure 1.

With reference to FIG. 4, the structure of the third transistor TFTS includes a gate 21 of the third transistor TFTS that is formed on a surface of a substrate 20, a semi-conductor layer 25 insulatedly mounted on the gate 21 of the third transistor TFTS, a source 22 and a drain 23 of the third transistor that are mounted on the semi-conductor layer 25, a passivation layer 26 covering the source 22 and the drain 23 of the third transistor and a top-gate electrode 27 and a second pixel electrode 24 that are mounted on the passivation layer 26.

The gate 21 of the third transistor TFTS is formed by sputtering a first metallic layer; the source 22 and the drain 23 of the third transistor are formed by sputtering a second metallic layer; and the top-gate electrode 27 and the second pixel electrode 24 are preferably formed by a transparent electrically conductive layer, such as indium tin oxide, wherein the top-gate electrode 27 is correspondingly positioned upon the gate of the third transistor TFTS, and the second pixel electrode 24 is connected to the drain 23 of the third transistor via a through hole.

With reference to FIG. 4, the top-gate electrode 27(TG) is insulatedly mounted on an area which is partially overlapped with the third transistor TFTS. The influence of such structure on the third transistor TFTS are: when applying different bias voltages to the top-gate electrode 27(TG), the threshold voltage of the third transistor TFTS itself will shift, that is, the top-gate electrode 27(TG) may change the threshold voltage of the third transistor TFTS according to a bias signal.

With the change of the threshold voltage of the third transistor TFTS, the variation of the gray scale voltage applied to the first liquid crystal capacitor Clc1 through charge-sharing will also change. Therefore, by applying different bias voltages to the top-gate electrode 27(TG), the variation of the gray scale voltage applied to the first liquid crystal capacitor Clc1 can be effectively adjusted, and so as to adjust the first liquid crystal capacitor Clc1 to be biased at a most ideal gray scale voltage after charge-sharing such that color-washout problem can greatly improved.

With reference to FIG. 2, the chare-sharing type pixel structure 1 further comprises a first storage capacitor Cst1 connected to the first transistor TFT1 and a second storage capacitor Cst2 connected to the second transistor TFT2. The first storage capacitor Cst1 is constructed by a first pixel electrode and a common line, wherein the first pixel electrode is connected to the drain of the first transistor. Similarly, the second storage capacitor Cst2 is constructed by a second pixel electrode 24 (as shown in FIG. 4) and the common line, wherein the second pixel electrode is connected to the drain of the second stransistor. The common line generally is formed together with the first gate line Gn and the second gate line Gn+1 so as to construct the first storage capacitor Cst1 and the second storage capacitor Cst2 with the first pixel electrode and the second pixel electrode, respectively.

Figure 3:
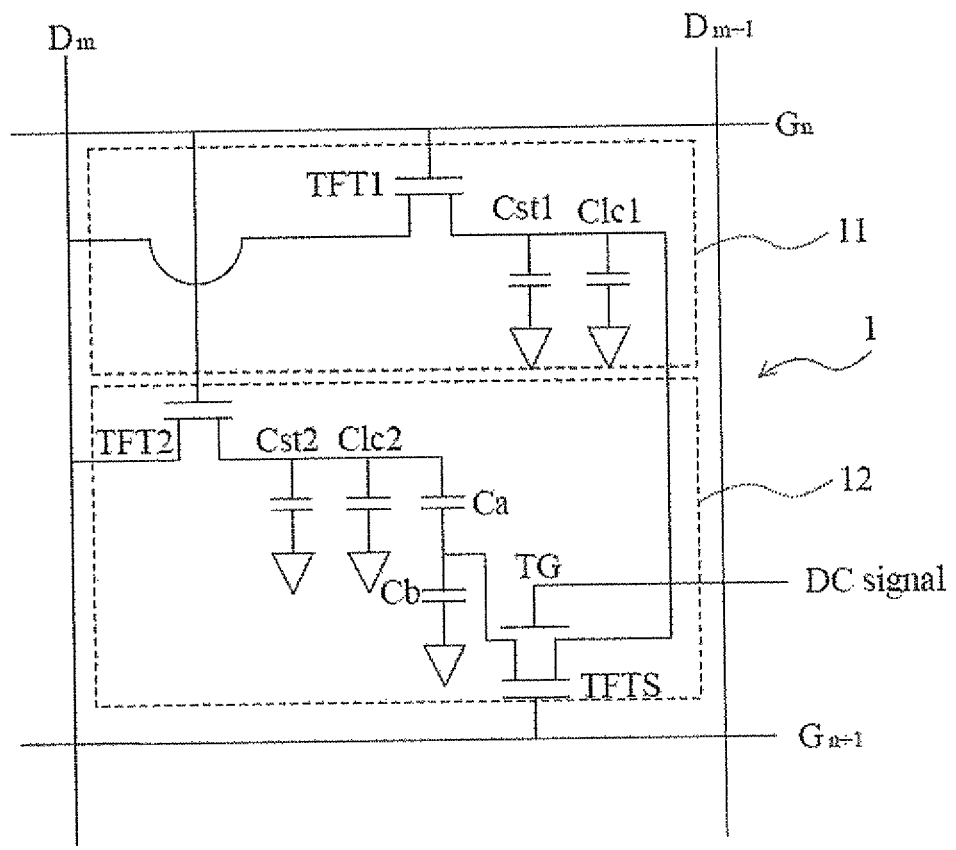
FIG. 3 is a circuit diagram of another preferred embodiment of the charge-sharing type pixel structure in accordance with the present invention.

The top-gate electrode 27(TG) may be formed together with the first pixel electrode and the second pixel electrode by the same transparent electrically conductive layer, such as indium tin oxide, through a photolithography process. Furthermore, in order to apply a biasing voltage to the top-gate electrode 27(TG) to adjust the variation of the gray scale voltage that is applied to the second liquid crystal capacitor Clc2, the top-gate electrode 27(TG) may be connected to a metallic signal line via an electrically conductive through hole. And the metallic signal line may be connected to the common line; or as shown in FIG. 3, the metallic signal line may be connected to a DC signal source. On the other hand, the top-gate 27(TG) may be a non-transparent electrically conductive layer and connected to a DC signal source.

It is worth noting that the top-gate electrode 27(TG) is not limited to the foregoing embodiments; it can be any electrical conductor that is partially and insulatedly overlapped with the third transistor and receives an adjusting biasing voltage.

By the above description, comparing with the conventional technology having a disadvantage of lacking flexibility on adjusting the division of gray scale voltage, the present invention provides an improved charge-sharing type pixel structure that a top-gate electrode is used to be mounted upon the voltage-dividing transistor such that the gray scale voltage applied to sub-pixels after charge-sharing can be adjusted by adjusting the biasing voltage applied to the top-gate electrode. Therefore, the division of gray scale voltages can be adjusted without changing the design of mask, the manufacturing cost is saved, and the adjustment for oblique viewing angle problem can be more flexible.

The present invention has been described with a preferred embodiment thereof and it is understood that many changes and modifications to the described embodiment can be carried out without departing from the scope and the spirit of the invention that is intended to be limited only by the appended claims.

What is claimed is:

1. A charge-sharing type pixel structure comprising:
a first gate line providing a first scanning signal;
a second gate line providing a second scanning signal;
a data line providing a data signal;
a first sub-pixel having:
a first transistor being connected to the first gate line and the data line and being switched on when receiving the first scanning signal from the first gate line;
a first liquid crystal capacitor being connected to the first transistor and receiving the data signal from the data line to be biased at a first gray scale voltage when the first transistor is switched on; and
a first pixel electrode being connected to a drain of the first transistor;
a second sub-pixel having:
a second transistor being connected to the first gate line and the data line and being switched on when receiving the first scanning signal from the first gate line;

a second liquid crystal capacitor being connected to the second transistor and receiving the data signal from the data line to be biased at a second gray scale voltage when the second transistor is switched on;

a third transistor being connected to a first voltage-dividing capacitor, a second voltage-dividing capacitor and the second gate line and being switched on when receiving the second scanning signal from the second gate line; when the third transistor is switched on, the first gray scale voltage applied to the first liquid crystal capacitor of the first sub-pixel varies due to charges being shared with the first voltage-dividing capacitor and the second voltage-dividing capacitor;

a top-gate electrode changing a threshold voltage of the third transistor according to a biasing signal to further adjust the variation of the first gray scale voltage of the first liquid crystal capacitor; and a second pixel electrode being connected to a drain of the second transistor; and a common line constructing a first storage capacitor with the first pixel electrode and constructing a second storage capacitor with the second pixel electrode; wherein the third transistor includes:
  a gate formed on a surface of a substrate;
  a semi-conductor layer insulatedly mounted on the gate;
  a source mounted on the semi-conductor layer;
  a drain mounted on the semi-conductor layer; and
  a passivation layer covering the source and the drain; wherein the top-gate electrode and the second pixel electrode are mounted on the passivation layer.

2. The charge-sharing type pixel structure as claimed in claim 1, wherein the top-gate electrode is a transparent electrically conductive layer and is partially and insulatedly overlapped with the third transistor.

3. A charge-sharing type pixel structure comprising:
a first gate line providing a first scanning signal;
a second gate line providing a second scanning signal;
a data line providing a data signal;
a first sub-pixel having:
  a first transistor being connected to the first gate line and the data line and being switched on when receiving the first scanning signal from the first gate line; and
  a first liquid crystal capacitor being connected to the first transistor and receiving the data signal from the data line to be biased at a first gray scale voltage when the first transistor is switched on; and
a second sub-pixel having:
  a second transistor being connected to the first gate line and the data line and being switched on when receiving the first scanning signal from the first gate line;
  a second liquid crystal capacitor being connected to the second transistor and receiving the data signal from the data line to be biased at a second gray scale voltage when the second transistor is switched on;
  a third transistor being connected to a first voltage-dividing capacitor and the second gate line and being switched on when receiving the second scanning signal from the second gate line; when the third transistor is switched on, the first gray scale voltage applied to the first liquid crystal capacitor of the first sub-pixel varies due to charges being shared with the first voltage-dividing capacitor; and a top-gate electrode changing a threshold voltage of the third transistor according to a biasing signal to further adjust the variation of the first gray scale voltage of the first liquid crystal capacitor; wherein the third transistor includes:
  a gate formed on a surface of a substrate;
  a semi-conductor layer insulatedly mounted on the gate;
  a source mounted on the semi-conductor layer;
  a drain mounted on the semi-conductor layer; and
  a passivation layer covering the source and the drain; wherein the too-gate electrode and the second pixel electrode are mounted on the passivation layer.

4. The charge-sharing type pixel structure as claimed in claim 3, wherein the second sub-pixel further has a second voltage-dividing capacitor being connected to the third transistor, and the second voltage-dividing capacitor shares charges with the first voltage-dividing capacitor and the first liquid crystal capacitor.

5. The charge-sharing type pixel structure as claimed in claim 3, wherein the pixel structure further comprises a first pixel electrode, a second pixel electrode and a common line: the first pixel electrode is connected to a drain of the first transistor, the second pixel electrode is connected to a drain of the second transistor, and the common line constructs a first storage capacitor with the first pixel electrode and constructs a second storage capacitor with the second pixel electrode.

6. The charge-sharing type pixel structure as claimed in claim 5, wherein the top-gate electrode is a transparent electrically conductive layer and is partially and insulatedly overlapped with the third transistor.

7. The charge-sharing type pixel structure as claimed in claim 6, wherein the top-gate, the first pixel electrode and the second pixel electrode are formed by the same transparent electrically conductive layer through a photolithography process.

8. The charge-sharing type pixel structure as claimed in claim 6, wherein the top-gate electrode is connected to a metallic signal line via an electrically conductive through hole.

9. The charge-sharing type pixel structure as claimed in claim 8, wherein the metallic signal line is the common line.

10. The charge-sharing type pixel structure as claimed in claim 8, wherein the metallic signal line is connected to a DC signal source.

11. The charge-sharing type pixel structure as claimed in claim 5, wherein the top-gate electrode is a non-transparent electrically conductive layer and connected to a DC signal source.

* * * * *